United States Patent [19]

Kamel et al.

[11] Patent Number: 4,746,976

[45] Date of Patent: May 24, 1988

[54] STAR SIGHTINGS BY SATELLITE FOR IMAGE NAVIGATION

[75] Inventors: Ahmed A. Kamel, Sunnyvale; Donald E. Ekman, Santa Clara; John Savides, Los Altos Hills; Gerald J. Zwirn, Mountain View, all of Calif.

[73] Assignee: Ford Aerospace & Communications Corporation, Detroit, Mich.

[21] Appl. No.: 867,356

[22] Filed: May 23, 1986

[51] Int. Cl.$^4$ .............................................. H04N 7/18
[52] U.S. Cl. ................................... 358/103; 358/109; 358/107; 358/125; 364/455
[58] Field of Search .............. 358/109, 125, 126, 103, 358/107, 93; 364/455, 559; 244/176

[56] References Cited

U.S. PATENT DOCUMENTS

| | | | |
|---|---|---|---|
| 3,120,578 | 2/1964 | Potter | 358/103 |
| 3,194,949 | 7/1965 | Jasperson | 364/455 |
| 3,439,427 | 4/1969 | Gow | 364/455 X |
| 3,636,330 | 1/1972 | Holeman | 364/455 |
| 3,769,710 | 11/1973 | Reister | 364/455 X |
| 3,772,516 | 11/1973 | Roberts et al. | 358/103 X |
| 3,952,151 | 4/1976 | Jenkin | 358/109 |
| 4,300,159 | 11/1981 | Hummer et al. | 358/109 |
| 4,404,592 | 9/1983 | Pepin et al. | 358/109 X |
| 4,617,634 | 10/1986 | Izumidu et al. | 364/455 |
| 4,627,329 | 11/1986 | Jacob | 364/455 |

OTHER PUBLICATIONS

Landecker, "Operational Spacecraft Attitude Determination Using Data from a Spinning Sensor", *The Journal of the Astronautical Sciences*, vol. 32, No. 2, Apr.-Jun. 1984, pp. 189-196.

Graul, Oral Presentation Accompanied by a Posterboard Display before the Environmental Research Institute of Michigan at its International Symposium on Remote Sensing of the Environment, Oct. 21, 1985.

Schwalb, "Envorosat-2000 Report; GOES-Next Overview", National Oceanic and Atmospheric Administration, Sep., 1985.

Koenig, "The GOES-Next Imager and Sounder", disseminated at American Meteorological Society Conference, Miami, Fla., Jan. 13-16, 1986.

Juarez and Koenig, "Infrared Imaging and Sounding from a Geostationary Body Stabilized Spacecraft", disseminated at AMS Second Conference on Meteorology/Remote Sensing and Application, Williamsburg, Va., May 12-16, 1986.

Primary Examiner—James J. Groody
Assistant Examiner—Victor R. Kostak
Attorney, Agent, or Firm—Edward J. Radlo; Keith L. Zerschling

[57] ABSTRACT

Stars are sensed by one or more instruments (1, 2) on board a three-axis stabilized satellite, for purposes of assisting in image navigation. A star acquistion computer (64), which may be located on the earth, commands the instrument mirror (33, 32) to slew just outside the limb of the earth or other celestial body around which the satellite is orbiting, to look for stars that have been cataloged in a star map stored within the computer (64). The instrument (1, 2) is commanded to dwell for a period of time equal to a star search window time, plus the maximum time the instrument (1, 2) takes to complete a current scan, plus the maximum time it takes for the mirror (33, 32) to slew to the star. When the satellite is first placed in orbit, and following first stationkeeping and eclipse, a special operation is performed in which the star-seeking instrument (1, 2) FOV is broadened. The elevation dimension can be broadened by performing repetitive star seeks; the azimuth dimension can be broadened by lengthening the commanded dwell times.

13 Claims, 8 Drawing Sheets

IMAGE NAVIGATION SYSTEM FUNCTIONAL BLOCK DIAGRAM

FIG. 2 STAR MAP—FOURTH MAGNITUDE OR BRIGHTER

FIG. 3 STAR AVAILABILITY WITH NO SUN INTERFERENCE
N/S FOV=21° E/W FOV=23° MAG=4.0 HT=200KM

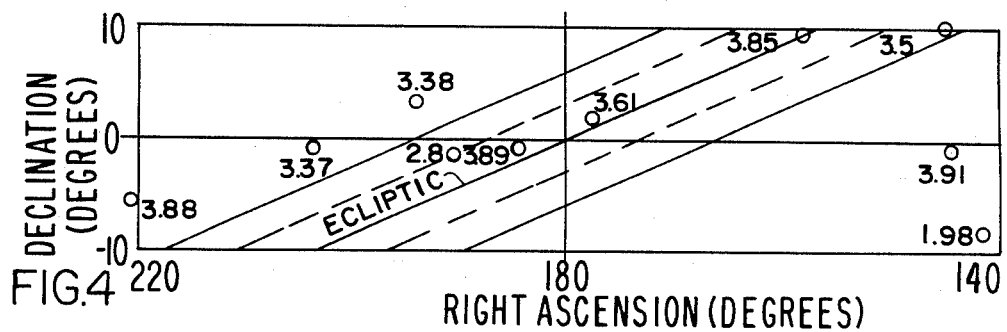
FIG.4
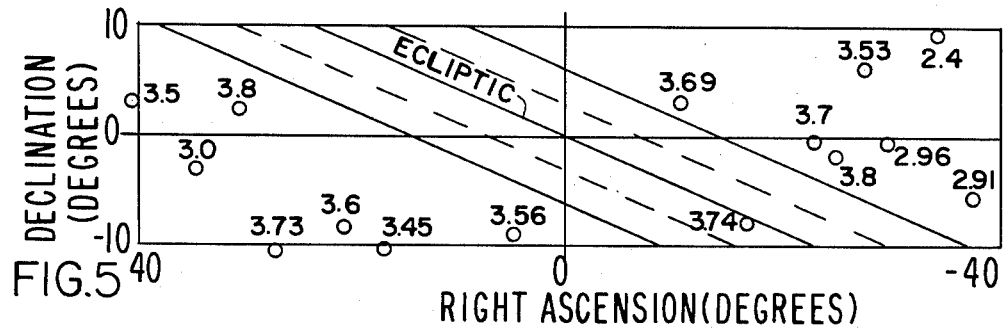
FIG.5
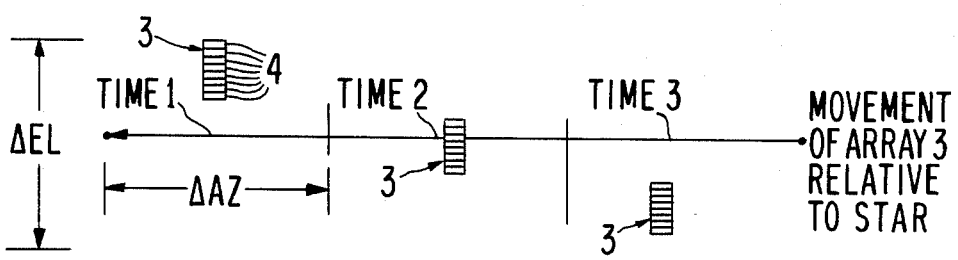
FIG.6 WIDE FOV STAR ACQUISITION

GOES IJKLM SATELLITE

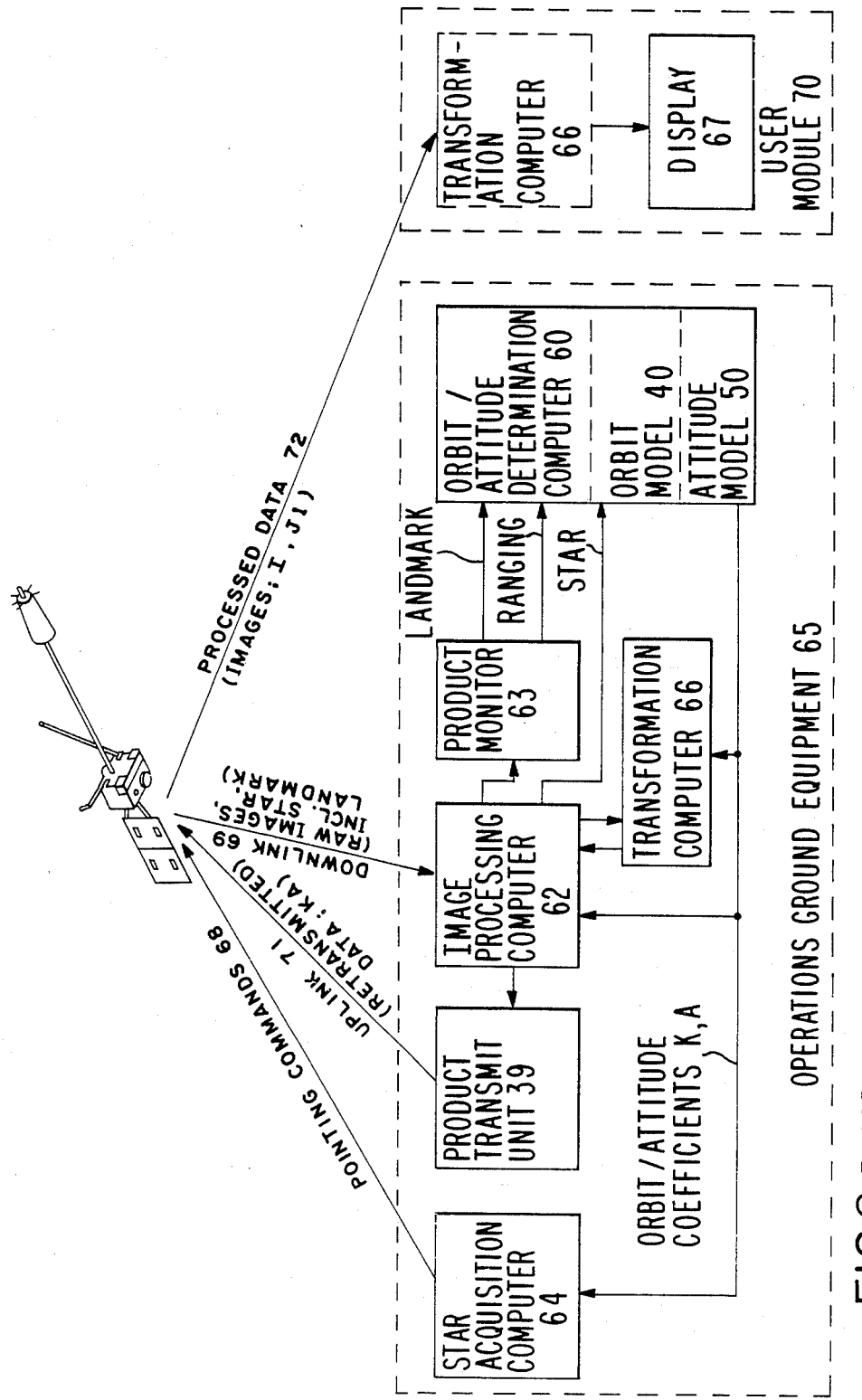
FIG.8 IMAGE NAVIGATION SYSTEM FUNCTIONAL BLOCK DIAGRAM

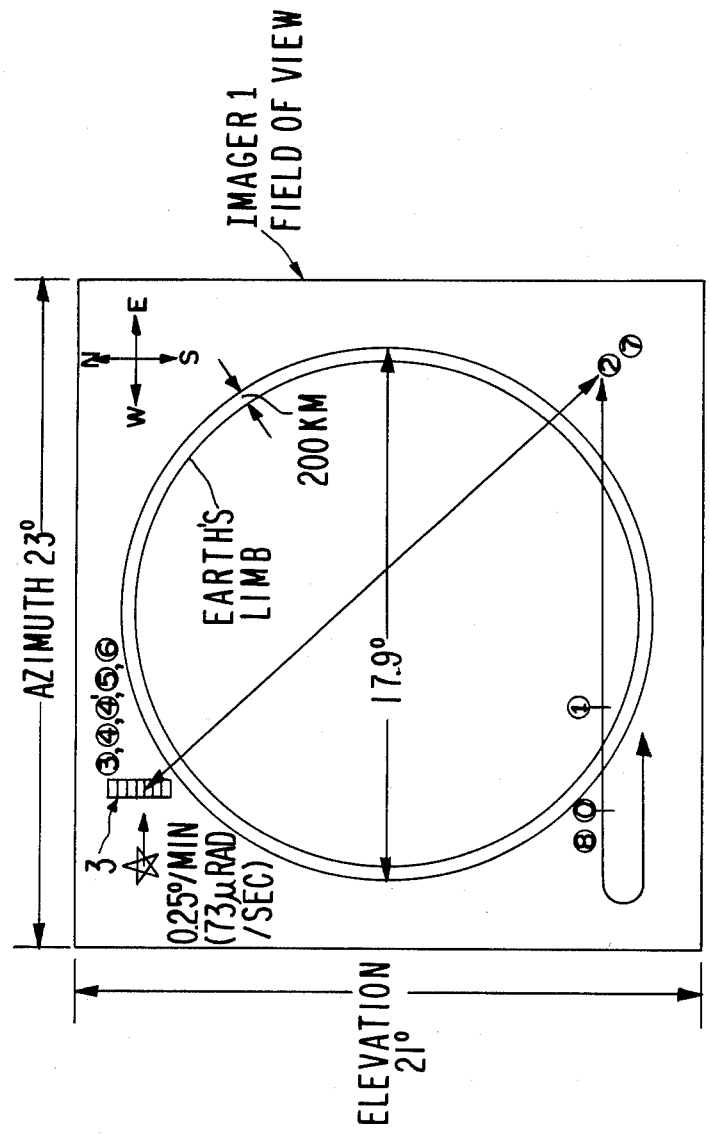
FIG.9 IMAGER 1 STAR-SIGHTING OPERATION

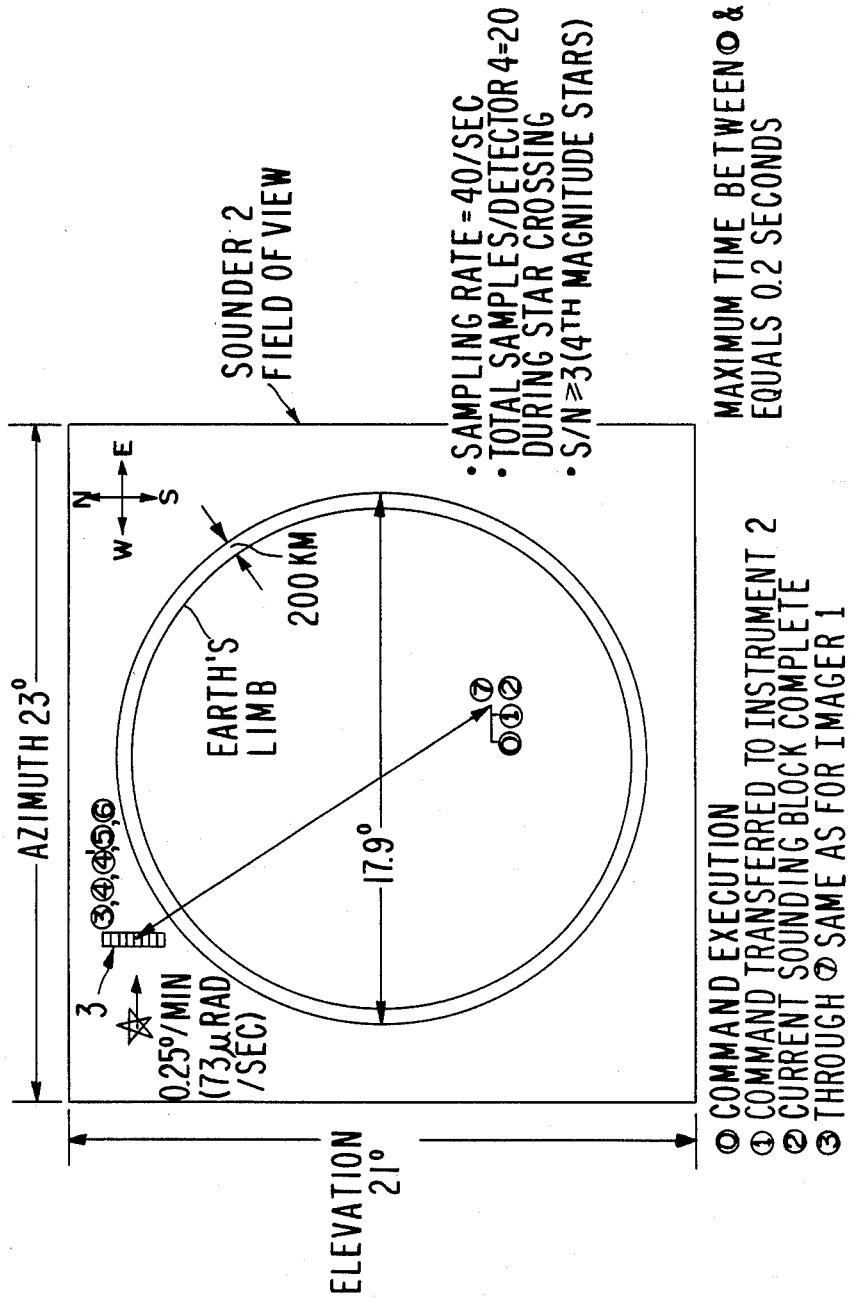

STAR SIGHTINGS BY SATELLITE FOR IMAGE NAVIGATION

STATEMENT OF GOVERNMENTAL INTEREST

The invention described herein was made in the performance of work under NASA contract no. NAS5-29500 and is subject to the provisions of §305 of the National Aeronautics and Space Act of 1958 (72 Stat. 435; 42 USC 2457).

TECHNICAL FIELD

This invention pertains to the field of using instruments on board satellites to perform image navigation. Image navigation is the process of locating, in terms of the latitude and longitude on the celestial body around which the satellite orbits, any pixel within any image produced by the satellite instrument.

BACKGROUND ART

Landecker, "Operational Spacecraft Attitude Determination Using Data from a Spinning Sensor", *The Journal of the Astronautical Sciences*, Vol. 32, No. 2, April-June 1984, pp. 189–196, describes a hypothetical method of attitude determination of a spinning satellite orbiting the earth, using an on-board radiometer to sense stars each time the spinning satellite is not facing the earth. The present invention, on the other hand, uses satellite instruments on a three-axis stabilized satellite to perform image navigation. Differences of the invention compared with the reference include:

1. In the reference, the radiometer is spinning very fast, about 100 rpm, because the radiometer is on the platform which provides stabilization to the satellite. Thus, the radiometer is moving past the inertially fixed stars at a rate of 36,000° per minute, compared with the 0.25° per minute in the present invention. As a consequence, the present invention offers a vastly superior signal-to-noise ratio.

2. The present invention controls slew in two orthogonal dimensions to precisely home in on the specific desired star. The reference, on the other hand, steps the radiometer optics in only one dimension. As a consequence, for a small area scan (a scan of less than the entire earth), the reference is limited to looking for starts within that narrower field of view. The present invention is not so restricted.

3. The present invention is used as part of an image navigation system to determine long term instrument attitude and satellite orbit parameters which are then compensated for in an image registration system. The reference, on the other hand, is used just for attitude and orbit determination.

4. The reference system requires knowledge of the magnitude of the stars being observed in order to function. On the other hand, the present invention looks for preselected stars, but is not dependent on their magnitude (within the sensitivity limits of the instruments 1, 2).

5. The reference system looks for stars during back-scan (away from the earth) while the present invention looks for stars just beyond the limb of the earth or other celestial body around which the satellite is orbiting.

The following four references allude in a general way to portions of the invention: (1) Graul, oral presentation accompanied by a posterboard display before the Environmental Research Institute of Michigan at its International Symposium on Remote Sensing of the Environment, Oct. 21, 1985; (2) Schwalb, "Envirosat-2000 Report; GOES-Next Overview", National Oceanic and Atmospheric Administration, September, 1985 (3) Koenig, "The GOES-Next Imager and Sounder", disseminated at American Meteorological Society Conference, Miami, Fla., Jan. 13–16, 1986; and (4) Juarez and koenig, "Infrared Imaging and Sounding from a Geostationary Body Stabilized Spacecraft", disseminated at AMS Second Conference on Meteorology/Remote Sensing and Application, Williamsburg, Va., May 12–16, 1986.

Secondary references are U.S. Pat. Nos. 3,952,151 and 4,300,159.

DISCLOSURE OF INVENTION

The present invention is a system for sensing stars by an instrument (1, 2) on board a three-axis stabilized satellite, for purposes of assisting in accomplishing the critical function of image navigation. The three-axis stabilized satellite orbits around a celestial body, such as the earth. On board the satellite, the instrument (1, 2) generates images of scenes on the celestial body. Means (64) commands the instrument's optics (33, 32) to slew in two orthogonal dimensions to detect stars just beyond the limb of the celestial body; means (62) processes signals generated by the instruments (1, 2) in response to star detection, to generate measured star locations; and means (60) updates the image navigation system with said measured star locations.

BRIEF DESCRIPTION OF THE DRAWINGS

These and other more detailed and specific objects and features of the present invention are more fully disclosed in the following specification, reference being had to the accompanying drawings, all of which relate to the illustrated embodiment of the present invention, in which:

FIG. 4 is a sketch of the sun's path along the ecliptic during the autumn, showing sun and moon interference bands;

FIG. 5 is a sketch of the sun's path along the ecliptic in the spring showing sun and moon interference bands;

FIG. 6 is a sketch suggesting how the field of view of imager 1 or sounder 2 is expanded in elevation and azimuth during an initialization or calibration special operation;

FIG. 8 is a functional block diagram showing the overall operations in an exemplary image navigation system in which the present invention plays a key role;

FIG. 9 is a sketch showing a normal on-orbit imaging field of view of imager 1, showing how imager 1 accomplishes star sightings; and FIG. 10 is a sketch of a normal on-orbit imaging field of view of sounder 2, showing how sounder 2 performs star sightings.

BEST MODE FOR CARRYING OUT THE INVENTION

Figure 7:
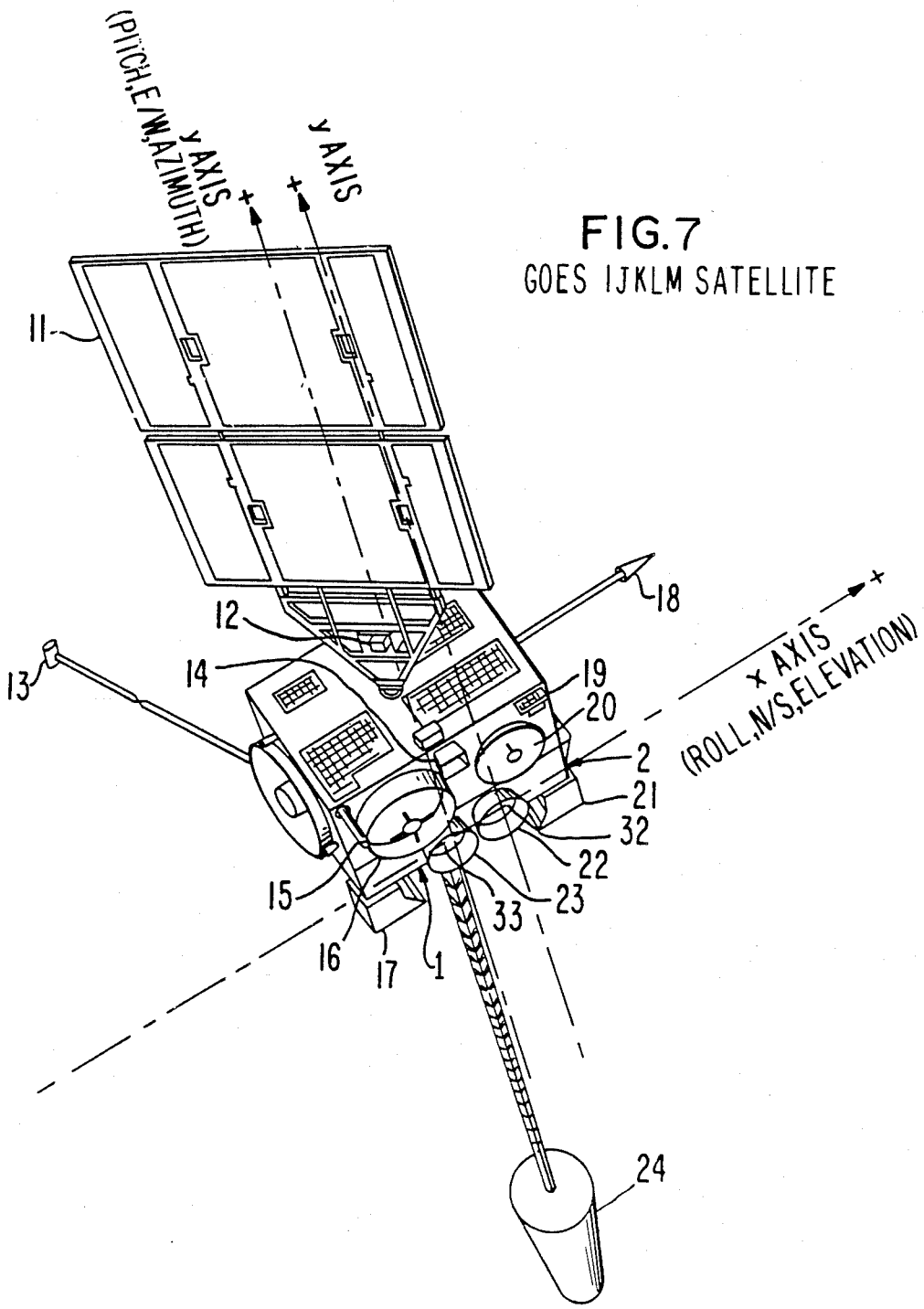
FIG. 7 is an elevational view of a satellite which can advantageously employ the present invention.

Although the present invention has utility on any type of satellite, whether in geosynchronous or other orbit around a celestial body, it will be particularly illustrated with respect to the satellite shown in FIG. 7: one of the geosynchronous GOES IJKLM meteorological satellites sponsored by NOAA (National Oceanic and Atmospheric Administration) and contracted for by NASA (National Aeronautics and Space Administration), for which the present invention is being built. The items shown on FIG. 7 include solar array 11, x-ray sensor 12, magnetometer 13, S-band transmit antenna 14, search and rescue antenna 15, UHF antenna 16, telemetry and command antenna 18, earth sensors 19, S-band receive antenna 20, solar sail 24, and two radiometers: imager 1 and sounder 2. Imager 1 comprises cooler 17, aperture 23, and mirror 33. Sounder 2 comprises cooler 21, aperture 22, and mirror 32.

The mirrors 33, 32 are each mounted on a two-axis gimbal which selectively positions the mirror 33, 32 with respect to orthogonal x and y axes. The imager mirror 33 moves at a very fast rate of many successive positions per second. The sounder mirror 32 step-scans at a slower rate. The common x axis can also be referred to as the roll, north/south, or elevation axis. The y axis for each mirror 33, 32 can also be referred to as the pitch, east/west, or azimuth axis.

Imager 1 provides multispectral radiometric imaging of the earth's surface, which can be useful, for example, in measuring transverse cloud velocity. Imager 1 has five channels, four infrared and one visible; its two-axis gimbaled scanning mirror 33 sweeps an eight kilometer longitudinal swath across an east/west path on the earth (comprising eight individual one-kilometer pixels arranged north/south), providing co-registered data of the viewed scene from all channels simultaneously. Position and size of the area scanned are controlled by command from scan logic associated with the imager 1. The field of view of imager 1 is divided into a set of parallel east-to-west scan lines, each comprising many pixels. The pixel size (on the earth) is as small as 1 km by 1 km for one of the channels (visible). A scan frame (comprising many scan lines) is that subset of the total possible field of view that is commanded to be scanned. The scan frame is scanned in 22 minutes for a whole earth scan, less for an "area scan" (portion of the earth). Passive radiation cooler 17 allows operation of the IR channels at lower temperature for increased sensitivity. Radiometric calibration is provided by periodic mirror 33 slews to space and to an internal blackbody target.

Sounder 2 measures moisture content and temperature of various constituent gases within the earth's atmosphere on a pixel-by-pixel basis. Sounder 2 is a 19 channel (18 infrared and 1 visible) radiometer. One IR channel is selected at a time by a discrete filter wheel; or else the visible channel is selected. The two-axis gimbaled scanning mirror 32 of sounder 2 effectively step-scans a 40 kilometer longitudinal swath of the earth across an east/west path in 10 kilometer increments. The nominal pixel size (on the earth) is 10 km by 10 km. A scan frame (comprising many scan lines) is scanned in about three hours for a whole earth scan, and less for an area scan. Passive radiation cooler 21 controls the IR detector assembly temperature. This allows operation at lower temperature for increased sensitivity. Radiometric calibration is provided by periodic mirror 32 slews to space and to an internal blackbody target.

Imager 1 and sounder 2 operate independently and simultaneously over a period of time known as an imaging or sounding "interval". The interval is specified to be at least 85 minutes. During an interval, several frames are scanned and several images made. At the end of the interval, the spacecraft may enter a five minute housekeeping mode, e.g., to fire thrusters for purposes of attitude control or momentum dumping.

Star measurement is facilitated when using a three-axis stabilized satellite such as the GOES IJKLM illustrated herein, because of the quiet environment of such a satellite. A star measurement uses the apparent drift of the stars across the field of view of the instrument's aperture 23, 22. This drift is produced by the pitch rate caused by the orbital rotation (at a rate of 0.25°/min) of the satellite about the earth.

The applicability of the present invention to image navigation is treated in commonly-assigned U.S. patent application Ser. No. 860,142 filed May 6, 1986. The applicability of the present invention to image registration is treated in commonly assigned U.S. patent application Ser. No. 860,373 filed May 6, 1986. Image registration is the process of limiting the error in the angular separation of corresponding pixels (with respect to each other) of repeated images (taken by instruments 1, 2) of the same selected imaging area (frame) to within a specified preselected limit.

Star sightings are the primary source of the information needed to maintain accurate real-time knowledge of the pointing direction of the mutually orthogonal optical reference axes x, y, z. To allow for possible alignment shifts and thermal distortions between the two instruments 1, 2, star sightings are taken separately by both instruments 1, 2.

A star measurement starts by a ground command issued by star acquisition computer 64 (see FIG. 8). For the case of star sighting by imager 1, imager 1 finishes its current scan line before it executes the command. Rather than scan the line of sight of the 8-detector array 3 across the star, mirror 33 is slewed so that the array 3 is looking slightly east of the star, and then mirror 33 motion is stopped. The apparent motion of the star through the detector from west to east results from the pitch motion of the satellite as it maintains its earth pointing attitude while orbiting the earth. The star, moving at the rate of 3 pixels per second (0.25°/min), crosses the stationary detector array 3 in 0.3 second. The array 3 is typically a linear detector array 3 operable at visible wavelengths, consisting of eight elements 4 aligned in a north-south (elevation) direction, and encompassing a total elevation angle of 224 microradians (28 microradians per detector 4). See FIG. 6.

While mirror 33 is stationary, the detector 4 outputs are sampled at a rate of about 20,000 per second and sent to the earth via downlink 69 to star signal processing computer 62 within OGE (operations ground equipment) 65. Special steering bits are inserted into the downlink 69 format as the mirror 33 slew to the star location begins, so that computer 62 can set up appropriate star data routing and processing paths. After measurement, mirror 33 is slewed back to start the next scan line from where it left off. The normal star sensing maneuver lasts approximately 10 seconds.

Separate star-sensing capability in sounder 2 (which uses a detector array 3 essentially identical as that for imager 1) provides for sounder 2 attitude determination, and therefore eliminates the need for accurate alignment of sounder 2 relative to imager 1. Star-sensing capability in these instruments 1, 2 also eliminates the need for accurate alignment of each instrument 1, 2 relative to the earth sensors 19.

Uncertainty in the absolute pointing direction of the detector array 3 line of sight results from uncertainties in the instrument 1, 2 attitude about the reference optical axes x, y, z; and from small variations in instrument 1, 2 scan control repeatability. During normal on-orbit mode, the total uncertainty in the elevation (N-S) direction from all these sources is about 29 microradians. Since the detector array 3 spans a total elevation angle of ±112 microradians, one positioning of mirror 33, 32 is sufficient to ensure that the star will be detected. Uncertainty in the azimuth (E-W) direction is of the same order, and is accommodated by positioning the line of sight eastward in azimuth from the star location by an amount sufficient to allow for the azimuth uncertainty, then holding the mirror 33, 32 stationary while the star passes through the detector array 3 field of view.

Image processing computer 62 receives over downlink 69 the raw images from the instruments 1, 2. These raw images include normal operations images, landmark images from imager 1, and star images from both instruments 1, 2, all in digital format. The data from the star-seeking modes includes amplitudes from each of the detectors 4 as a function of time, as well as an identification of each detector 4 by position. Computer 62 determines the time of star detection by subtracting the known fixed propagation delays from the current time. Computer 62 translates this time information to azimuth of the detected star with respect to the optical axes x, y of the instrument 1, 2. Computer 62 compares amplitude information from all the detectors 4 to generate elevation of the detected star with respect to the optical axes x, y of the instrument 1, 2. If signals from two adjacent detectors 4 are equal or almost equal, computer 62 interpolates accordingly. This technique provides accuracy of better than ½ a pixel. (One pixel equals 28 microradians.)

Computer 62 also processes the normal operations images for retransmission to one or more earth-based user modules 70 via product transmit unit 39, uplink 71, and downlink(s) 72. Star sighting data are processed online by computer 62, generating the azimuth/elevation coordinates of the detected stars, and inputted to orbit/attitude determination computer 60 in real time. Computer 60 compares the measured az/el coordinates with predicted coordinates of stars from an internally stored star map (e.g., that shown in FIG. 2) that is identical to the star map stored within computer 64.

Landmark data are processed offline using product monitor (PM) 63 and disks, to generate landmark coordinates that are inputted to computer 60 by PM 63 as they become available. The landmark and ranging data are used for determination of the orbit.

Ranging data is processed off line by PM 63. The processed ranging data are inputted to computer 60 by PM 63 as they become available.

Computer 60 compares the star, landmark, and range measurements with values predicted by internally stored models 40, 50. Orbital model 40 gives the orbital parameters P (satellite altitude, and satellite latitude and longitude at the subsatellite point) as a slowly moving function of time. The coefficients K in orbital model 40 are the six Keplerian (orbital) elements at epoch. Attitude model 50 gives the movement of the x, y, z axes for each of the instruments 1, 2 as a slowly moving trigonometric function of time. Coefficients A of model 40 (which are the amplitudes of the harmonic terms) represent daily variations due to solar radiation pressure effects on yaw, structural thermal distortions, and earth sensor 19 thermal drift. Coefficients K, A are updated on the basis of the comparison of the star, landmark, and range measurements with values predicted by models 40, 50.

A known recursive filter or an algorithm such as the one known as the "walking least squares fit" is used by computer 60 to update coefficients K, A. This provides continuous end-to-end-calibration of the image navigation system, and self-compensation of aging, thermal effects, and all other long-term effects. The walking least-squares fitting needs to be done but weekly to update the orbital coefficients K, and every half hour to update the attitude coefficients A. Coefficients A can be fitted separately and independently from coefficients K, or, alternatively, both sets of coefficients A, K can be fitted together.

The following example illustrates the case where the coefficients K, A are determined together by the walking least squares fit algorithm. The measurements sent by computer 62 and PM 63 to computer 60 include coordinates of the stars and landmarks, plus range data, plus the times these measurements were taken. An initial guess of the coefficients K and A is used for initialization of models 40, 50. Based upon this initial guess, models 40, 50 are used to calculate the "measurements", i.e., the range, the azimuth and elevation of the detected stars, and the azimuth and elevation of the detected landmarks. These calculated measurements are compared with the observed measurements as provided by computer 62 and PM 63. The differences between the calculated and observed measurements are known as "measurement residuals". Measurement residuals for each star sighting are calculated separately (based upon a comparison of the measured star locations with the star map within computer 60), then added to all the other residuals (star, landmark, and ranging) for the previous 24 hours. Then the coefficients K, A are updated simultaneously, by applying the walking least squares fit algorithm, which also uses as an input the partial derivatives of the calculated measurements with respect to the coefficients K, A. The result is a set of estimated coefficients K, A.

If the last preselected several of these sets of estimated coefficients K, A have been converging, the process is considered to have been successful, and these estimated coefficients K, A become the coefficients K, A outputted by computer 60 to star acquisition computer 64, product transmit unit 39, and transformation computer 66. If, on the other hand, the estimated coefficients K, A have not been converging, another iteration of the walking least squares fit algorithm is entered into, by means of the initial guess of coefficients K, A being replaced by the latest iteration of the estimated coefficients K, A.

Coefficients K, A are incorporated in the documentation of the imaging and sounding data that are sent to the user modules 70 via product transmit unit 39, uplink 71, and one processed data link 72 for each user module 70. Uplink 71 and each processed data link 72 also contain earth latitude and longitude coordinates of preselected image pixels of imager 1, and earth latitude and longitude of all pixels of sounder 2. Links 71 and 72 also contain the locations of the first pixel in each imager 1 scan line; and grid points for given ground locations, given as pixel numbers, so that political boundary maps can be superimposed on the images displayed on user displays 67. Displays 67 may be hard copies, images on CRT's sent for distribution via commercial television stations, etc.

Transformation computer 66 within OGE 65 receives coordinates of each scan line (I) and first pixel (J1) within each scan line from computer 62. Computer 66 subjects these I, J1 pixel coordinates to three transformations: $T_1$, $T_2$, and $T_3$. $T_1$ transforms I, J1 to an AZ, EL for each pixel (angular position of the corresponding mirror 33, 32 with respect to its y and x axes, respectively) based on the known scanning rate characteristics of the mirror 33, 32. These known characteristics are stored within computer 66. $T_2$ is an attitude transformation which transforms each AZ, EL into pixel angles as viewed from the orbit. $T_2$ uses as inputs the roll, pitch, and yaw deviations of the x, y, z axes from attitude model 50. The information to calculate these data is provided to computer 66 from computer 60, in the form of coefficients A. Finally, $T_3$ transforms the pixel angles as viewed from the orbit into earth latitude and longitude, using the orbital parameters P. The information to calculate these parameters P is found in orbital coefficients K provided to computer 66 by computer 60.

An optional transformation computer 66 is present in each user module 70, for purposes of calculating earth latitude and longitude for all of the pixels from imager 1, not just the preselected ones of said pixels for which transformation computer 66 within OGE 65 calculates said earth latitude and longitude. Transformation computer 66 within module 70 operates identically to transformation computer 66 within OGE 65, except that all its input information (I, J1, K, A) is provided by processed data downlink 72.

To accommodate star-sighting opportunities that may occur during, as well as between, image frames, imager 1 is commanded by a priority star-sense command, which overrides the normal imaging operation of the imager 1. When a sighting is required and a suitable star is available, as determined by the aforesaid catalog (map) of stars stored within star acquisition computer 64, a star-sense command is uplinked to the satellite via uplink 68. Imager 1, upon receipt of this command, implements an automatic process in which it completes its current scan line, stores the current scan location in memory, slews its mirror 33 to the commanded location at which the star is to appear, and dwells there for a length of time known as a "commanded dwell time" or "commanded dwell interval". At the end of the commanded dwell time, imager 1 retrieves the memory-stored scan location and completes the automatic process by slewing its mirror 33 to the proper position to retrace the last scan line and then to resume scanning the next scan line.

Star sightings are accomplished in sounder 2 with a special detector array 3 essentially identical to the imager 1 visible detector array 3. This array 3 has no function other than star sightings. Sounder 2 also is activated by a priority star sense command. Operation of sounder 2 upon receipt of this command is identical to that of imager 1, except that the sounding activated is interrupted at the end of the current sounding location rather than at the end of the current scan line. (Sounder 2 dwells for 0.075 second at each location.) At the end of the star sense commanded dwell time, sounder 2 automatically resumes its sounding activity at the next location.

In the normal on-orbit mode, our knowledge of the pointing direction of the optical reference axes x, y of imager 1 is approximately ±0.0025° in both elevational and azimuth. If we were to position the detector array 3 exactly 0.0025° east of the expected star location and wait for the pitch motion of the satellite (0.25°/min) to cause the star to pass through the array 3 to a position 0.0025° beyond, the required transit time would be 1.20 seconds (s). We allow a one second margin by positioning the detector 0.00458° east of the star location and waiting for the star to pass through and to an equal angle beyond. This adjusted transit time, which we refer to as the "star search window", is 2.20 s, and is illustrated by solid bars in FIG. 1. The extra time in the star search window includes a factor for attitude uncertainties and a small additional margin of safety.

Since the star look commands are prepared by computer 64 in advance, with time tags for real-time release, it is impractical to assume that at the time of command preparation, computer 64 will know what the mirror 33 position with respect to the star location will be at command execution. Hence, the mirror 33 must start slewing to the star location in advance of the beginning of the required commanded dwell interval by an amount equal to the maximum-distance slew time, which is 2.0 s, plus an additional lead time of 0.2 s to account for mirror 33 settling. (See FIG. 1.) As previously stated, when imager 1 executes the star look command, it completes the current scan line before slewing to the star location. A maximum-length line, just begun, will require 0.9 s to complete. Hence, to allow for line completion and slew, plus an additional 0.2 s for mirror 33 to settle at the end of the slew, plus an additional 0.1 s for the command to enter imager 1 after reaching the satellite over uplink 68, command execution by computer 64 must occur 3.2 s in advance of the required commanded dwell interval.

Figure 1:
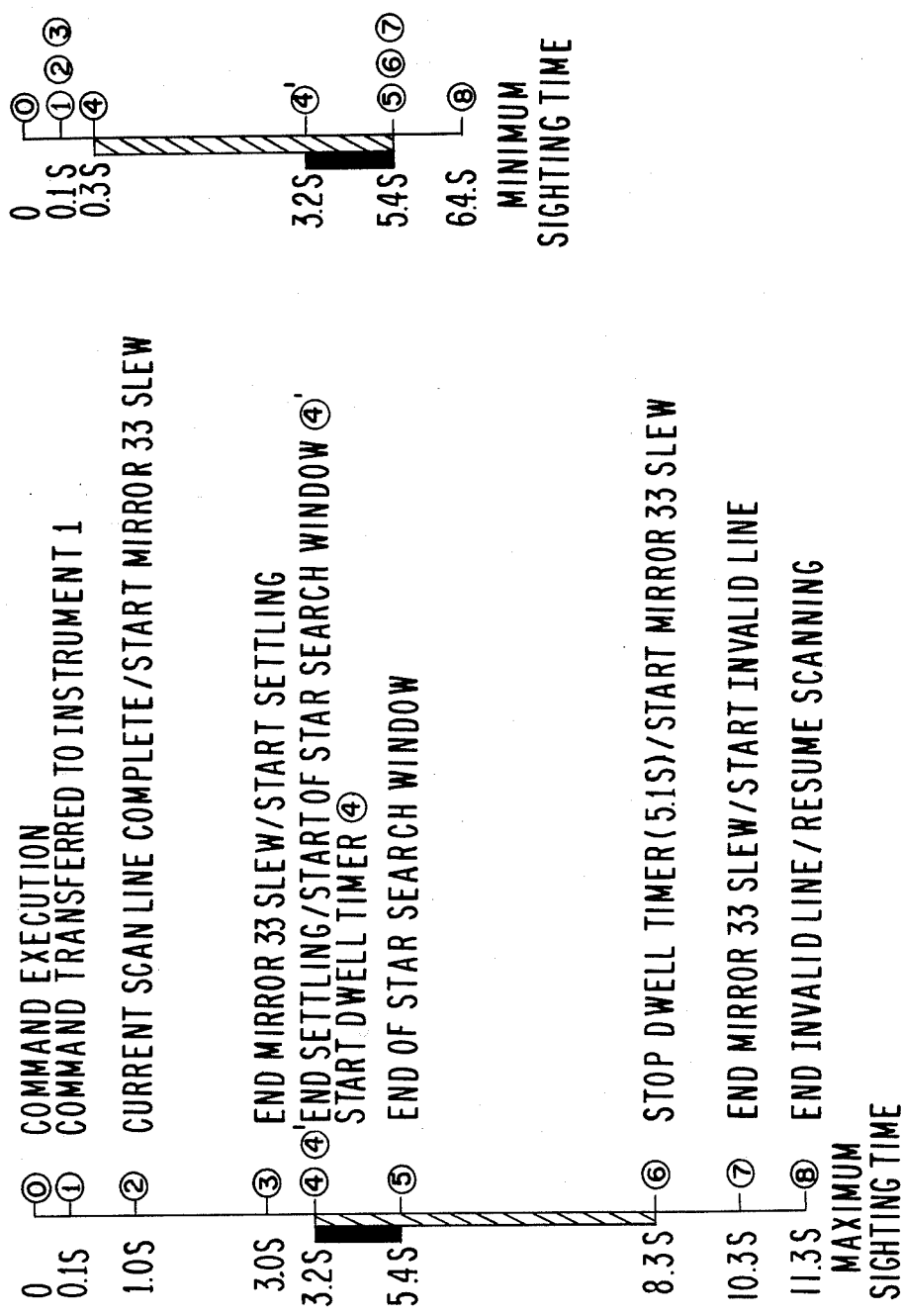
FIG. 1 is a pair of time lines showing star search windows and commanded dwell times for star-sightings by imager 1 in the normal on-orbit mode.

An onboard dwell timer associated imager 1 is started when mirror 33 arrives at the required location. The commanded dwell time is shown in FIG. 1 as a bar having hatchings that slope in a single direction.

Command execution (the time at which the command reaches the satellite after traveling over uplink 68) is defined to be time 0. In FIGS. 1, 9, and 10, time n is represented by n with a circle around it, where n is a positive integer representing the step in the operation. FIG. 9 should be examined in conjunction with the left-hand side of FIG. 1 (the maximum sighting-time line for imager 1).

The command reaches imager 1 at 0.1 s (time 1). The current scan line is completed at 1.0 s (time 2), and mirror 33 begins to slew. At 3.0 s (time 3), mirror 33 arrives at the required location, and the dwell timer associated with mirror 33 commands mirror 33 to dwell (stare). The star search window begins at 3.2 s (time 4'), which allows 0.2 s for mirror 33 to settle.

In the event that a scan line has just begun at command execution, and a maximum-distance slew is required to reach the star location, the commanded dwell time, measured from mirror 33 arrival at the star location, could be made equal to the duration of the star search window (2.2 s), and mirror 33 would start to reslew to begin the next image line at command execution plus 5.4 s. However, it could also happen that the required start location is located at the end of the current line, which is just completing at command execution. In this case, mirror 33 arrival would be 2.9 s early, and if the commanded dwell interval were not increased, mirror 33 would also depart 2.9 s early, thus missing the star. To cover the entire range of cases between these two extremes, we always add 2.9 s to the dwell time, making the commanded dwell time always 5.1 s.

In the case of maximum-distance slew, with the constant 5.1 s commanded dwell time, mirror 33 reslew starts at 8.3 s from command execution (time 6). At 10.3 s (time 7), reslew is complete and the previous scan line is retraced (simply as an electronic convenience). This "invalid" scan line is completely retraced by 11.3 s (time 8), and normal scanning resumes. Thus, the maximum time to conduct the star sighting, measured from command execution to resumption of normal scanning, is 11.3 s. The minimum time, occurring when the star location is positioned at the end of the current scan line and the current scan line is just being completed, is 6.4 s. This condition is graphically illustrated on the right-hand time line of FIG. 1.

Star-sighting by sounder 2 (illustrated in FIG. 10) is identical to that by imager 1, with one important difference. When sounder 2 executes a priority star sense command, the maximum time from receipt of the command to the beginning of mirror 32 slew is the maximum time required to complete the current sounding location, or 0.1 s. Thus, the commanded dwell time for mirror 32 is fixed at 4.3 s rather than 5.1 s. Therefore, the maximum time required for sounder 2 to sense a star is this 4.3 s, plus 0.1 s for command transmittal, plus 0.1 s for completion of sounding, plus 2.0 s for mirror 32 slew, plus 0.2 s for mirror 32 settling, plus 2.0 s for mirror 32 reslew, for a total of 8.7 s. (There is no "invalid line" repeat scan as with the imager 1.) The minimum time for sounder 2 to perform a star sighting is 4.6 s.

Computer 64 uses its internally stored catalog of star locations, along with current models 40, 50 of orbit and attitude provided by computer 60, to determine star-sighting opportunities. Having computed the star azimuth and elevation and the star search window, computer 64 subtracts 3.2 s from the beginning of the star search window (2.4 s for sounder 2) to arrive at command execution time.

FIGS. 9 and 10 show that the normal imaging field of view for both imager 1 and sounder 2 is 21° N/S and 23° E/W. Stars just outside the earth's limb (up to a height of 200 km out) are obscured by the earth's atmosphere. Therefore, a circle having a diameter of 17.9° is unavailable for star sighting. Outside of this circle, the remainder of the 21°×23° FOV is available for star sighting.

Figure 2:
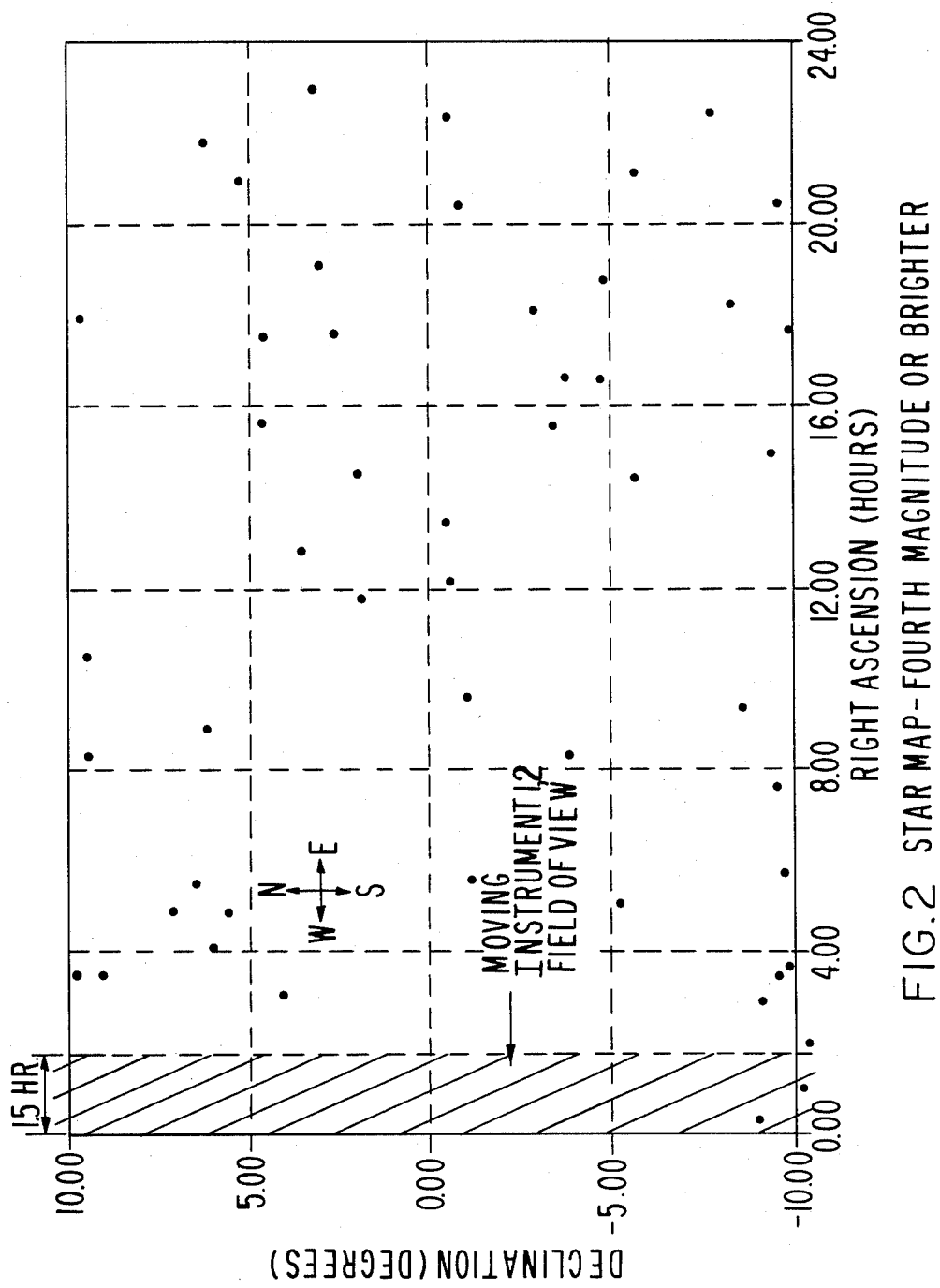
FIG. 2 is a map of preselected stars, which is identically stored within computers 60 and 64.

We have compiled a catalog of 50 starts of magnitude 4.0 or brighter that lie in a declination band of ±10.5° and are thus visible to imager 1 and sounder 2. FIG. 2 shows the location of these stars. (In FIG. 2, the right ascension axis is compressed by a factor of 12 with respect to the declination axis. Thus, the stars appear to be much closer to one another in right ascension than they truly are.)

The 21°×23° field of view of each instrument 1, 2 corresponds to ±10.5° declination and 1.5-hour right ascension, respectively. This field moves across the star map once per day. (The first star is sighted at the west end of the moving field of view, and the last star is sighted at the east end of the moving field of view.)

Spacecraft orbit inclination is maintained at 0.1° by means of stationkeeping maneuvers. This inclination has no effect on star sightings because several degrees can be accommodated without any significant effect on the number of stars to be sighted for image navigation. A spacecraft inclination of 1° corresponds to a N-S (declination) shift of ±1° of the star map relative to the instrument 1, 2 field of view. Even a shift of several degrees will not ruin image navigation, because the instrument 1, 2 field of view always contains several stars except in the region near the origin of FIG. 2. In this case, the field of view contains no stars within a 2.5-hour right ascension interval between 0.5 and 3 if the inclination is greater than 0.5°. This gap occurs once a day, and is overcome by taking star sightings at least once per hour.

Figure 3:
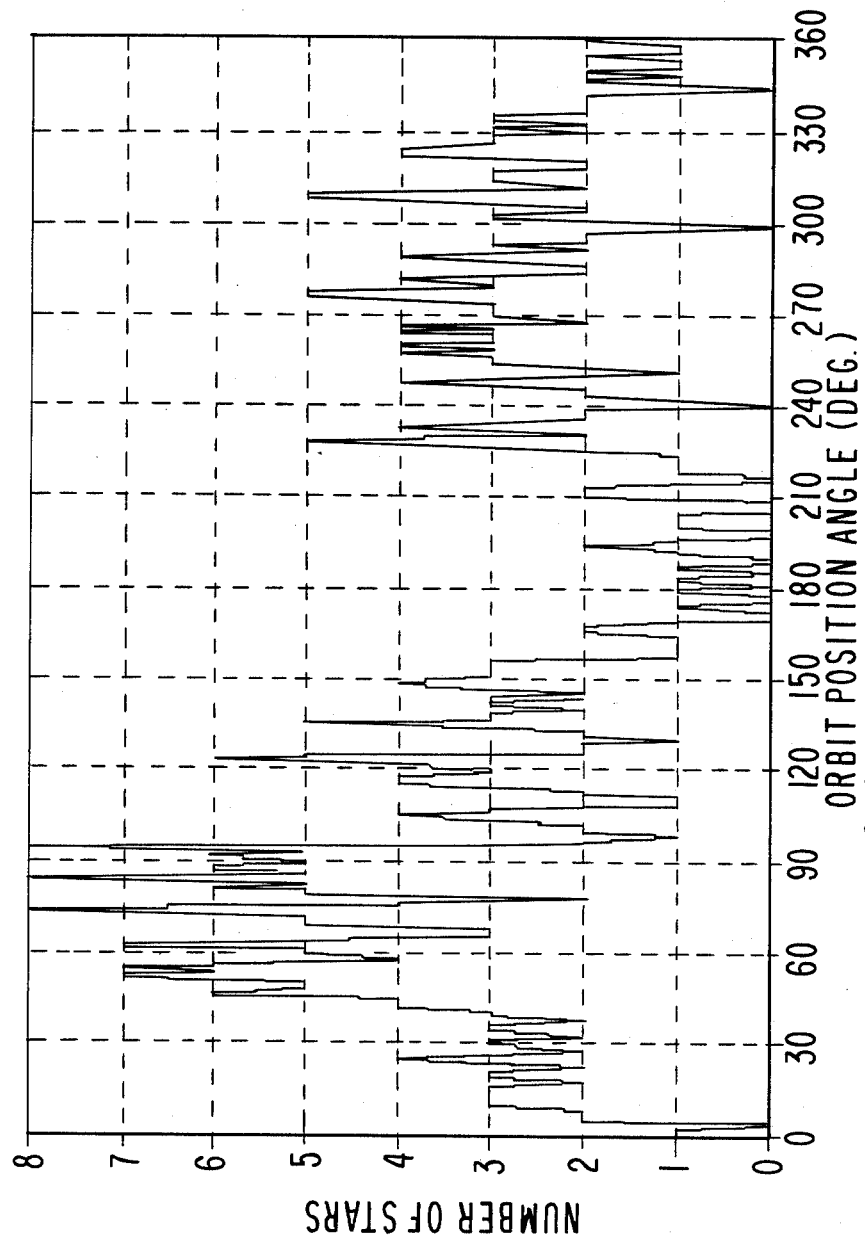
FIG. 3 is a graph of the number of stars within the effective field of view of instrument 1, 2 as a function of orbit position angle.

FIG. 3 graphically presents the number of magnitude 4.0 or brighter stars (as a function of orbit position angle) that lie within the field of view of either instrument 1, 2 and whose apparent displacement from the earth's limb is at least 200 km. Table 1 presents this information in terms of the percentage of an entire day during which zero, one, two, and more than two stars are visible. Table 1 also shows the longest continuous (daily) period during which no stars are visible. Table 1 considers two conditions: (1) no sun or moon interference; and (2) worst-case sun/moon interference, i.e., the sun angle=3°, or the moon angle=1° and the moon is full. Sun interference can occur during 6 days in spring, and over a 6-day and 20-day interval in autumn. Moon interference is rare, occurring no more than 2 hours per year.

TABLE 1

Percentage of Time During Which Various Numbers of Stars are Visible

| | Number of Stars Visible | | | | |
|---|---|---|---|---|---|
| Condition | 0 | 1 | 2 | more than 2 | Maximum Time With No Star Visible |
| No Sun or Moon Interference | 14.2% | 31.7% | 33.6% | 20.6% | 32 min |
| Worst Case Sun/Moon Interference | 15.3% | 30.8% | 33.3% | 20.6% | 56 min |

FIGS. 4 and 5 illustrate the worst-case interference conditions, for autumn and spring, respectively. The 80 minutes of right ascension correspond roughly to a 23° east/west FOV. The illustrated 20° north/south FOV's are a bit smaller than the actual 21° north/south FOV's. The numbered circles represent stars in our catalog and their corresponding magnitude. FIGS. 4 and 5 show the sun's motion along the ecliptic (the plane in which the earth revolves about the sun) as the sun passes through the equatorial plane on the other side of the earth from the satellite. The dashed sun interference lines parallel to the ecliptic are 3° on each side of the ecliptic. A star is not viewable due to instrument 1, 2 optical constraints when the sun is within 3° of the star. There is a 6-day period in the autumn during which the magnitude 3.85 star is within this 3° zone and therefore cannot be viewed. There is a 20-day period in the autumn when one of the remaining three stars is in this band and therefore is not viewable. Whenever there is sun interference, it is midnight local (satellite) time. At this time, only the IR channels are operating, and the image accuracy requirements are reduced.

The solid lines paralleling the ecliptic are 5° limits and bound the stars that are potentially interfered with by the moon. The moon is always within 5° of the ecliptic. When there is moon interference, it is noon local (satellite) time. Moon interference can occur at any season. However, it is rare. Moon interference occurs no more than 2 hours during the entire year.

FIG. 5 shows the path of the sun along the ecliptic in the spring. There is a 6-day period in the spring during which the magnitude 3.74 star is within 3° of the ecliptic (represented by the dashed lines) and cannot be viewed. This constraint has no adverse impact on performance, because it happens only once a day. The rest of the day, stars are available at least at the rate of one star every half hour.

Computer 64 is programmed with full sun and moon ephemeris data. Computer 64 further comprises means for suppressing the issuance of star sighting commands to the instruments 1, 2 when the ephemeris data informs that sun or moon interference exists.

Our star sightings do not depend on being able to discriminate between stars by magnitude, but on detecting only one star in the expected region of each of our 50 catalog stars. To verify that there is no potential interference by other stars not in our catalog, a 0.17° by 0.17° area around each of the 50 stars was searched for the presence of other stars. The reference for this search was the Smithsonian Astrophysical Observatory (SAO) catalog, which is complete to magnitude 9.0 (approximately 250,000 stars). Three of our 50 stars have such close neighbors. The brightest of the neighbors has magnitude 7.4, which is too dim to be detected by imager 1 or sounder 2.

Three special operations are used for updating the attitude coefficients A, other than the normal star-sensing which occurs during normal imaging intervals. In each of these special operations, the effective field of view of the detector array 3 is widened. These three special operations are startup initialization, post-eclipse calibration, and post-stationkeeping calibration.

During the first day of on-orbit imaging and sounding, the startup initialization operation is performed. This entails precise determination of the orbit by computer 60; instrument 1, 2 static alignments; and diurnal thermal variation calibration. To ensure capturing a star with an elevation pointing uncertainty of approximately ±0.85°, each instrument 1, 2 is commanded to take 16 looks (rather than a single look) for a single star. The effect of the satellite's orbital motion (0.25°/min) is accounted for by shifting successive star looks in the azimuth direction.

For simplicity, only three looks are shown in FIG. 6: the position of an eight-detector array 3 from imager 1 or sounder 2 is shown at time 1, time 2, and time 3. At these three times, the detector array 3 is in three different non-overlapping elevational (north/south) positions. This effectively increases the field of view in the elevational direction by a factor of three. The field of view in the azimuth direction can be increased by increasing the star search window component of the commanded dwell time proportionately.

After one day, the satellite is expected to be sufficiently under control that star-sighting times can be reduced as described previously in conjunction with the normal on-orbit mode, in which just one look is made for one star.

As an emergency backup procedure, the startup initialization operation can also be executed when no star is found in any of the eight detectors 4 in the normal star-seeking mode.

In the first eclipse season, the post-eclipse calibration is performed, for purposes of compensating for satellite thermal deformation. The temperature-calibrated data obtained from this post-eclipse calibration is then used for the rest of the mission. On emergence from an eclipse, slight thermal deformation of the satellite results in a worst-case pointing uncertainty in elevation of approximately 276 microradians, which is larger than the angle encompassed by the detector array 3 of either instrument 1, 2. In this condition, four looks with the detector array 3 are required to ensure capturing a single star. The commanded dwell times for these looks are also increased because the pointing uncertainty in azimuth is also about 276 microradians. After one hour (at least two sightings with each instrument 1, 2), normal on-orbit conditions will again be achieved.

After the first east/west and north/south stationkeeping maneuvers are executed, the post-stationkeeping calibration is performed. The results of this calibration are changes to the attitude coefficients A. These results are used following subsequent stationkeeping maneuvers (an average of once every 10 weeks) for the rest of the mission, since it is assumed that each stationkeeping maneuver has substantially the same effect on the satellite in general and on the instruments 1, 2 in particular. Following a stationkeeping maneuver, the pointing uncertainties are about ±0.02° in both azimuth and elevation. For post-stationkeeping calibration, four looks are required to ensure detecting a single star. After 90 minutes, normal on-orbit mode is again entered.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, computers 60, 62, 64, and 66 may be part of one large computer. Star sensing and landmark imaging may be performed at wavelengths other than visible.

What is claimed is:

1. A system for performing image navigation of a camera on board a satellite, said system comprising:
   a three-axis stabilized satellite orbiting a celestial body;
   at least a first camera on board the satellite for gathering data from scenes of the celestial body;
   means for periodically commanding an optical component of the camera to slew in two orthogonal dimensions to detect, by means of a one-dimensional array of detector elements, preselected stars just beyond the limb of the celestial body and any atmosphere of the celestial body;
   coupled to the camera, means for processing signals produced by the camera in response to detection of the preselected stars, to generate precise measurements of locations of the preselected stars; and
   coupled to the processing means, means for feeding the measured star locations to an image navigation computer which determines the attitude of the camera with respect to the celestial body.

2. The system of claim 1 wherein the computer comprises a model of orbital and attitude parameters and a star map; and the measured star locations comprise the azimuth and elevation, with respect to the camera's optical axis, of each detected star.

3. A system for performing image navigation of a camera on board a satellite, said system comprising:
   a three-axis stabilized satellite orbiting a celestial body;
   at least a first camera on board the satellite for gathering data from scenes of the celestial body;
   means for commanding an optical component of the camera to slew in two orthogonal dimensions to detect stars just beyond the limb of the celestial body;
   coupled to the camera, means for processing signals produced by the camera in response to star detection, to generate measured star locations; and
   coupled to the processing means, means for feeding the measured star locations to an image navigation computer;
   wherein the system further comprises a second camera;
   the first and second cameras independently detect stars; and
   information determined by said star detection is used by the processing means and computer to independently determine the attitude of each camera.

4. The system of claim 1 wherein the camera gathers the data by scanning across a series of generally parallel scan lines; and
   an estimate of the satellite's orbit is generated by the computer from measurements of stars taken by the camera.

5. The system of claim 1 wherein the optical component is commanded by the commanding means to dwell at an angular orientation that is fixed with respect to the orbiting satellite, such that the field of view of the optical component includes at least one star from a predetermined catalog of stars stored within the commanding means, for a length of time comprising:
   the maximum time required by the optical component to complete a current scan and slew to its star sighting position; and
   a star search window time comprising the time for the target star to pass through the field of view of the optical component, plus a time equivalent to the uncertainty in the knowledge of the exact pointing of the camera, plus a preselected error margin.

6. The system of claim 1 wherein the celestial body is the earth; and
   the commanding means, processing means, and feeding means are located in a command station on the earth.

7. The system of claim 1 wherein the celestial body is the earth;
   sun and moon ephemeris data is stored within the commanding means; and
   the commanding means is inhibited from commanding the camera to detect stars when the ephemeris data indicates that sun or moon interference is present.

8. The system of claim 1 wherein the processing means processes many samples of a star signal produced by the camera for each detected star.

9. A system for performing image navigation of a camera on board a satellite, said system comprising:
   a three-axis stabilized satellite orbiting a celestial body;
   at least a first camera on board the satellite for gathering data from scenes of the celestial body;
   means for commanding an optical component of the camera to slew in two orthogonal dimensions to detect stars just beyond the limb of the celestial body;
   coupled to the camera, means for processing signals produced by the camera in response to star detection, to generate measured star locations; and
   coupled to the processing means, means for feeding the measured star locations to an image navigation computer; wherein:
   the commanding means expands the effective star-seeking field of view of the optical component in a first dimension by commanding the optical component to seek more stars than for normal on-orbit operations; and
   the commanding means expands the field of view of the optical component in a second dimension, orthogonal to the first, by increasing the star-seeking commanded dwell time of the optical component compared with normal on-orbit operations.

10. The system of claim 9 wherein the field of view expansion is performed as part of a startup initialization during the first day the orbiting camera gathers data from the scenes.

11. The system of claim 9 wherein the field of view expansion is performed as part of a post-eclipse calibration operation following the first eclipse experienced by the orbiting satellite; and data from said operation is used to compensate for thermal attitude deformations caused by said first eclipse and by subsequent eclipses that occur during the life of the satellite.

12. The system of claim 9 wherein the field of view expansion is performed as part of a post-stationkeeping calibration operation following the first stationkeeping maneuvers performed by the orbiting satellite; and
    data from said operation is used to compensate for attitude perturbations caused by said first stationkeeping maneuvers and by subsequent stationkeeping maneuvers performed during the life of the satellite.

13. The system of claim 1 wherein the measured star locations are determined independently of the magnitudes of the detected stars.

* * * * *

UNITED STATES PATENT AND TRADEMARK OFFICE
CERTIFICATE OF CORRECTION

PATENT NO. : 4,746,976
DATED : May 24, 1988
INVENTOR(S) : Ahmed A. Kamel, Donald E. Ekman, John Savides, Gerald J. Zwirn It is certified that error appears in the above-identified patent and that said Letters Patent are hereby corrected as shown below:

In Col. 13, line 2, delete "axis," and insert in place thereof --axes,--.

Signed and Sealed this

Eighteenth Day of October, 1988

*Attest:*

DONALD J. QUIGG

*Attesting Officer*   *Commissioner of Patents and Trademarks*